Aug. 21, 1956 — R. F. DEHN — 2,759,582
POWER CLUTCH
Filed Sept. 5, 1952 — 5 Sheets-Sheet 1

INVENTOR.
BY ROY F. DEHN
Williams, Hudson, Boughton, David & Hoffmann
ATTORNEYS

Aug. 21, 1956   R. F. DEHN   2,759,582
POWER CLUTCH

Filed Sept. 5, 1952   5 Sheets-Sheet 3

INVENTOR.
ROY F. DEHN
BY Hudson, Boughton,
Williams, David & Hoffmann.
ATTORNEYS Aug. 21, 1956 R. F. DEHN 2,759,582
POWER CLUTCH
Filed Sept. 5, 1952 5 Sheets-Sheet 5

INVENTOR.
ROY F. DEHN
BY Hudson, Baughton,
Williams, David & Hoffmann
ATTORNEYS

United States Patent Office 2,759,582
Patented Aug. 21, 1956

2,759,582

POWER CLUTCH

Roy F. Dehn, Wickliffe, Ohio, assignor to The Cleveland Crane & Engineering Company, Wickliffe, Ohio, a corporation of Ohio Application September 5, 1952, Serial No. 307,968

8 Claims. (Cl. 192—85)

The present invention relates to power operated machine tools, such as shear or punch presses, having a continually driven flywheel adapted to drive a shaft through a power clutch.

A principal object of the present invention is the provision of a new and improved power press or the like having a shaft and a flywheel journaled thereon adjacent to one end thereof, clutch means including friction members at the side of the flywheel adjacent to the end of the shaft for drivingly connecting the flywheel and shaft, and a plate-like member detachably connected concentric with the flywheel and cooperating therewith to form a closure for the friction members which closure may be opened for access to th friction members by removing the member axially from the flywheel, and guide means to support the member while removed from the flywheel and to guide it into cooperating position with the flywheel for reconnection therewith.

Another object of the invention is the provision of a new and improved power shear press or the like, having a shaft to be driven intermittently by a continually driven flywheel, rotatably supported on the shaft adjacent to one end thereof, through a power clutch comprising a fluid cylinder member at the end of the shaft and detachably connected with one side of the flywheel, the cylinder member forming with the flywheel a housing or closure for certain of the clutch members adjacent to the flywheel and having means to support the member on the shaft for sliding movement from the side of the flywheel to gain access to the clutch members while maintaining the member in axial alignement with the flywheel to facilitate reattachment thereto.

Another object of the invention is the provision of a new and improved power clutch of the character referred to having an annular clutch actuating piston in the cylinder member operated by fluid directed into the member, and the cylinder member having an inwardly extending hub portion comprising a bearing to support the member for axial movement on the shaft and which projects through the central opening of the piston, and fluid seal means interposed between the hub and adjacent annular walls of the piston and between the adjacent piston and cylinder walls.

A still further object of the invention is the provision of a new and improved shear press or he like including a clutch of the character referred to having a part of the cylinder member extending across the outer end of the intermittently driven shaft, the shaft having a lubrication passage from the outer end thereof to the bearing for the flywheel, and the outer portion of the cylinder member having an opening for access to the lubrication passage.

The invention resides in certain constructions and combinations and arrangements of parts, and further objects and advantages will be apparent to those skilled in the art to which it relates from the following description of the preferred embodiment described with reference to the accompanying drawings forming a part of this specification, and in which:

Fig. 7 is a wiring diagram of the electrical controls for the press.

Figure 1:
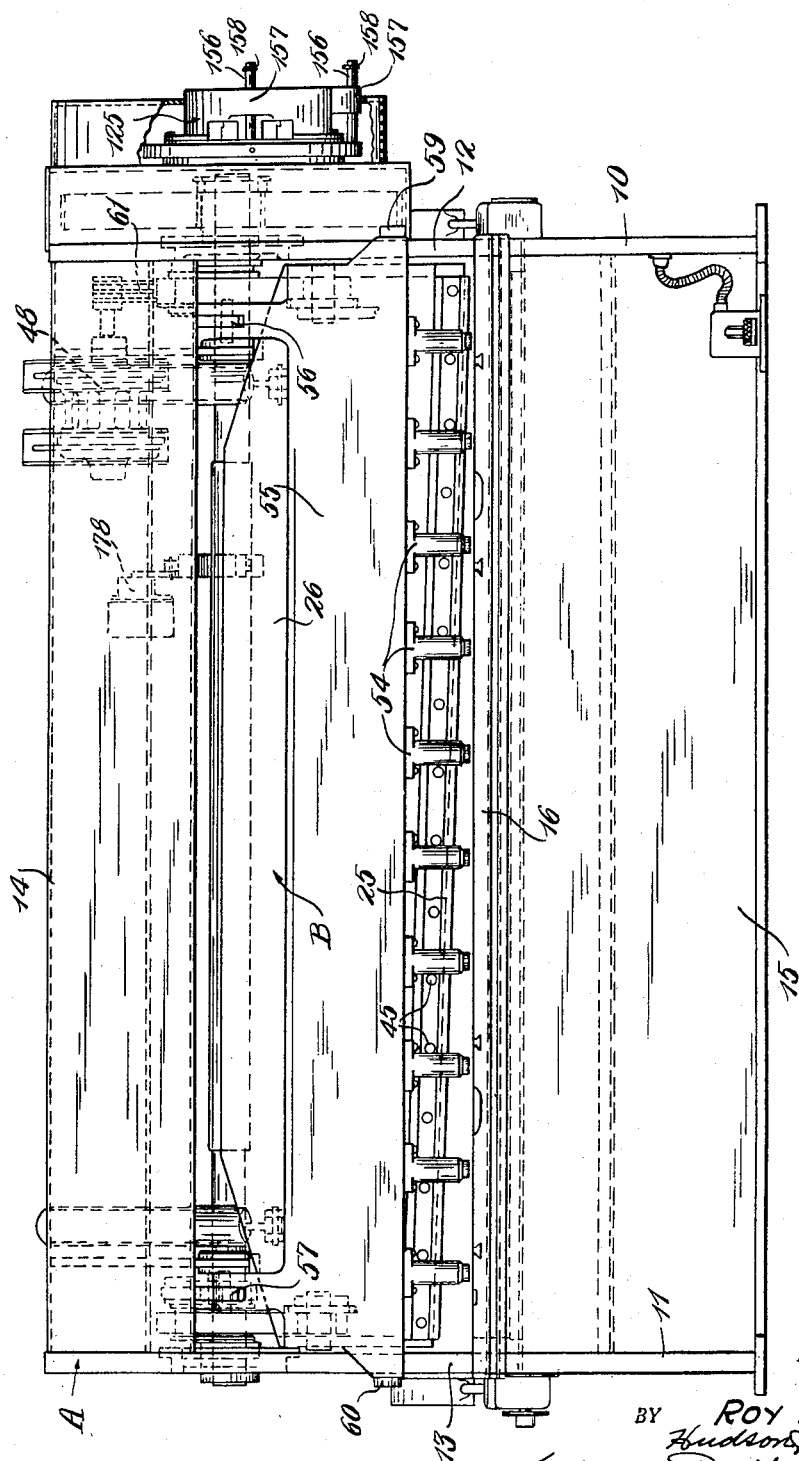
Fig. 1 is a front elevational view of a power-operated, heavy duty shears embodying the present invention.
Figure 2:
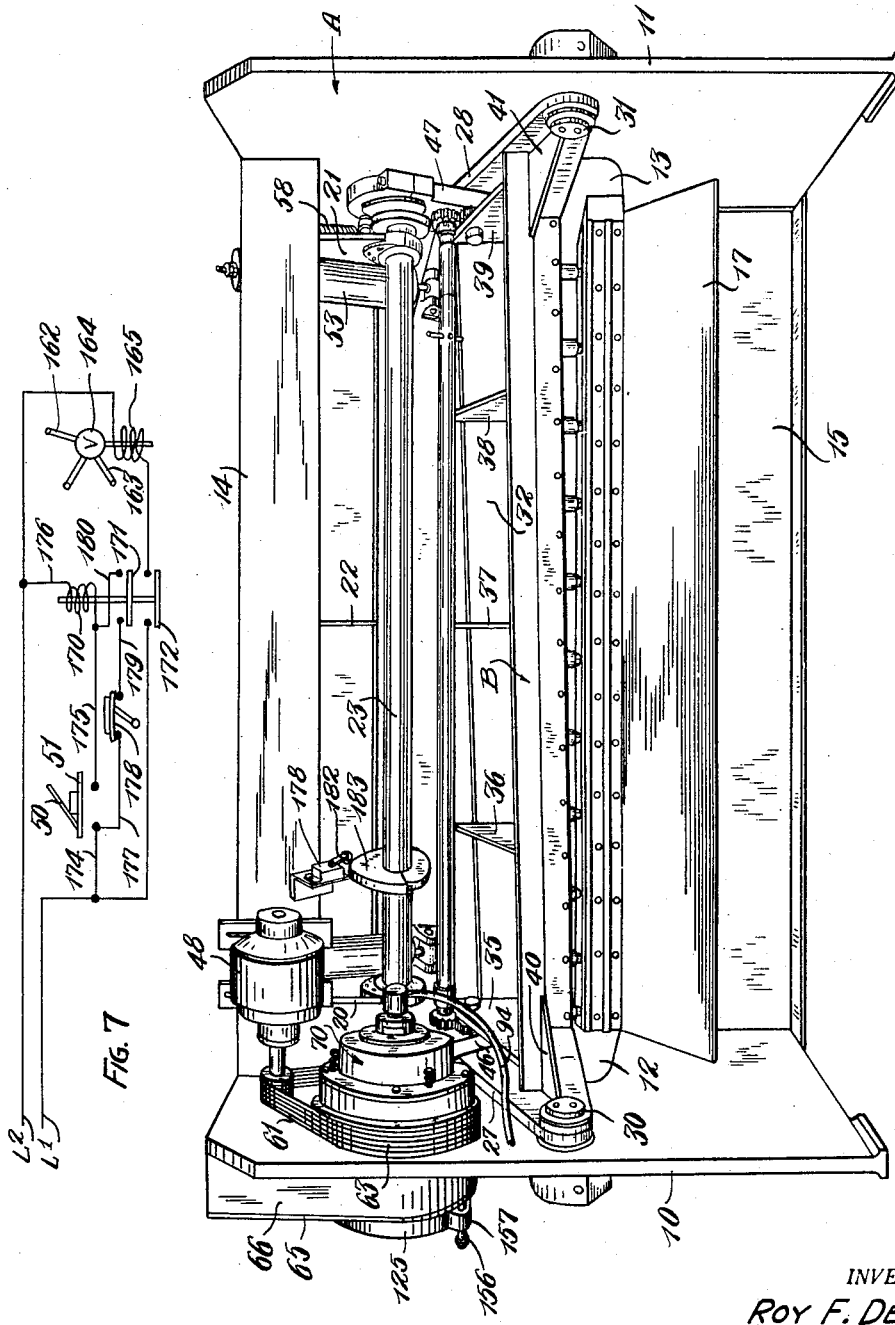
Fig. 2 is a rear view of the shears.

Although the invention may be embodied in various types of machine tools such as those having a continually driven power member adapted to be drivingly engaged intermittently with a driven part of the machine for example, it is here shown embodied in a power shear press. To a large extent, the shears shown herein are similar to the shears shown and described in the patent to William G. Wehr, No. 2,397,896, granted April 2, 1946, and only those parts of the shears which are necessary to a complete understanding of the present invention are herein shown and described in detail. Reference to the aforesaid patent is made for a complete showing and description of those parts of the shears not fully shown and described herein.

Referring to the drawings, the reference character A designates a frame comprising stress-resisting, plate-like end members or side housings 10, 11 having aligned openings 12, 13, respectively, in their front edges, a crown 14, and a bed comprising plate-like members 15, 16, 17, the latter of which forms a scrap chute. The vertical plate-like member 15 is located immediately to the rear of and welded to the horizontal plate-like member 16, which member in addition to reinforcing the upper edge of the member 15, forms a support or work table for the work. The upper member or crown 14 is generally box-shaped in cross section and has its opposite ends welded to the side housings 10, 11 adjacent to their front upper edges. Web members 20, 21, 22 welded to the interior of the member 14 reinforce the same and the lower ends of the members 20, 21 which extend below the rear side of the member 14 form supports for suitable bearings within which a crankshaft 23 is rotatably supported.

The shearing operation is performed by a stationary shearing knife 24 located in a cut-out portion at the upper rear corner of the bed and a movable shearing knife 25 connected to the lower front edge of a movable ram or blade, designated generally by the reference character B. The movable ram or upper blade B which extends substantially from one side of the housing to the other is of built-up construction and comprises a longitudinally extending front plate 26 welded to the front ends of rearwardly extending end members 27, 28, the rear ends of which are rotatably connected to short, shaft-like members 30, 31 rotatably supported in suitable apertures in the side housings 10, 11, respectively, for rotation about an axis eccentric to the axis about which the end members 27, 28 are rotatable. The axis about which the ram or blade B is pivoted is preferably slightly above the plane of the work supporting surface of the bed.

In addition to the front plate 26 and the end members or plates 27, 28, the upper blade or ram B comprises a plate 32 extending between and welded to the end members 27, 28 and a bottom plate 33 having an upwardly extending rear flange 34. The front edge of the bottom plate 3 abuts against and is welded to the rear side of the plate 32 adjacent to the lower edge thereof and the ends of the bottom plate are welded to the end members 27, 28. The blade assembly is reinforced by web members 35, 36, 37, 38, 39 welded to the front plates 26 and 32 and to the bottom plate 33 and by triangular plates 40, 41 welded to the rear side of the bottom plate 33 and the end members 27, 28.

Figure 3:
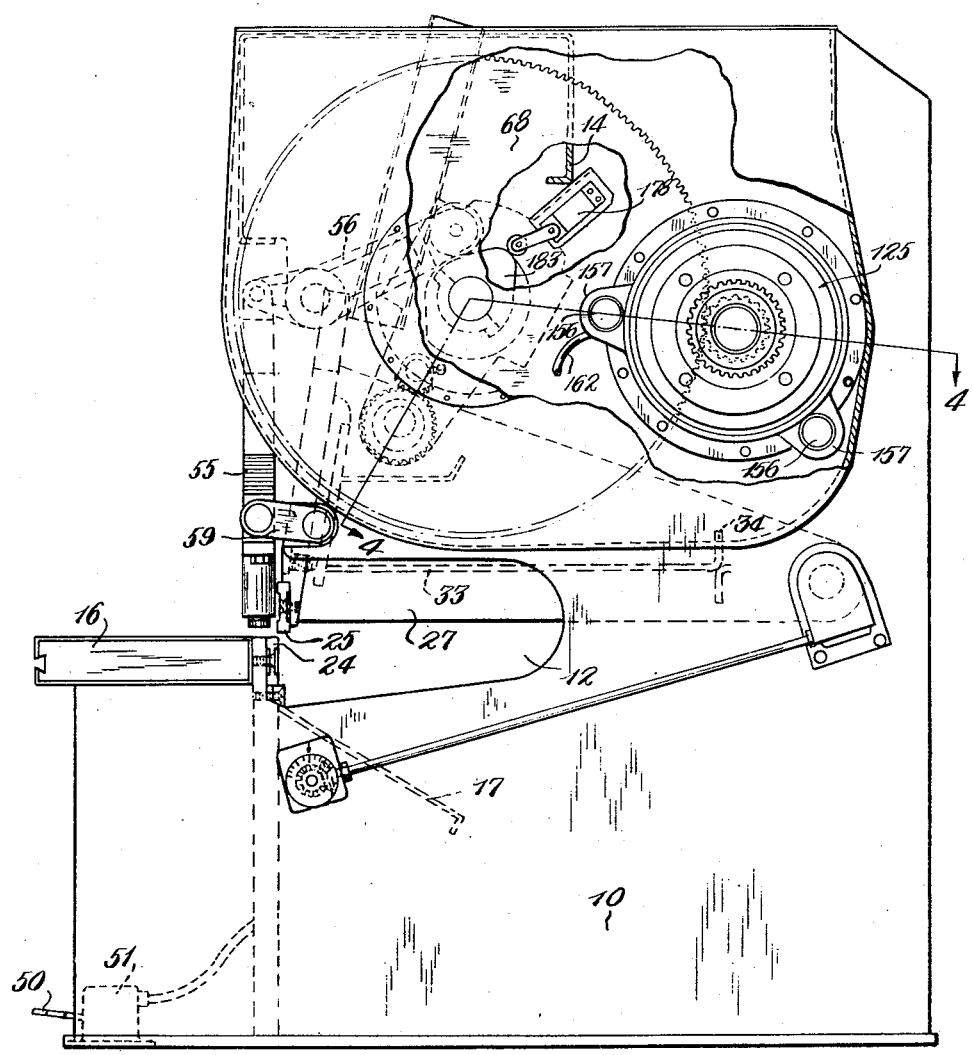
Fig. 3 is an end view of the shears, looking from the right of Fig. 1.

The front plate 26 of the blade B is inclined at a slight angle to the vertical, as clearly shown in Fig. 3, to provide clearance between the ram or blade B and the stationary knife when the blade is oscillated. The lower front edge of the plate 26 is cut out so as to receive the upper shearing knife 25, which knife is held in position therein by a plurality of screws 45 projecting therethrough and threaded into suitably tapped apertures adjacent to the lower edge of the plate 26. The heads of the screws 45 are located in a groove in the front face of the shearing knife and are countersunk so as not to interfere with the oscillation of the movable blade B. The lower edge of the plate 26 is inclined lengthwise so that the knives will effect a true shearing action.

The front end of the ram or movable blade B is supported by and the entire blade assembly is adapted to be oscillated about the shafts 30, 31 by pitmans 46, 47, the upper ends of which are operatively connected to eccentrics on the crankshaft 23. The lower ends of the pitmans are connected to short shafts fixed in opposite ends of the blade B. The rotation of the crankshaft 23 is effected and controlled to reciprocate the ram or blade B in one or more complete shearing strokes by an electric motor 48 adjustably secured to the back of the crown 14 and operatively connected to the crankshaft by means including a clutch which is controlled in synchronism with a brake mechanism in such a manner, as will be presently described, that when the operating pedal 50 of an electric control switch 51 is depressed and immediately released, the crankshaft makes one complete revolution but will continue to rotate as long as the pedal is depressed. As shown, the weight of the movable blade B is counterbalanced by adjustable compression springs, one at either end of the ram, located within tubular housings 52, 53 fixed to the crown member 14.

The shears shown also include a plurality of spring-loaded, hold-down devices 54 detachably bolted to the lower edge of a hold-down plate 55 suspended from the forward arms of bell crank levers 56, 57 pivotally connected to the plates 20, 21, the rear arms of which levers are provided with rollers adapted to engage cams on the crankshaft 23. The levers 56, 57 are continuously urged in a clockwise direction, as viewed in Fig. 3, to engage the rollers thereon with the cams on the crankshaft by suitable compression springs 58 interposed therebetween and the top of the crown member 14. The lower part of the hold-down plate 55 is connected to the side housings 10, 11 by links 59, 60, one at either side of the hold-down plate, pivotally connected to the hold-down plate and to the side housings 10, 11.

The rotor shaft of the motor 48 is connected by a flexible drive connection designated generally as 61 to a grooved pulley or flywheel 63 rotatably supported on a shaft 64, which shaft is in turn rotatably supported in suitable bearings fixed to the side housing 10 and to a plate 65 spaced therefrom but connected thereto by an irregularly shaped plate 66 interposed therebetween and the side housing 10. The plates just mentioned form an enclosure or compartment on the outside of the side housing 10 which houses mechanism including a pinion gear 67 keyed to the shaft 64 and in mesh with a large gear 68 keyed to the end of the crankshaft 23.

The flywheel 63, which is driven continuously by the motor 48, is journalled on shaft 64 by anti-friction bearings 69 which provide free relative rotation between the flywheel and shaft, and the flywheel is adapted to be connected and disconnected with the shaft 64 by which the crankshaft 23 is rotated and the movable blade B oscillated by the new and improved power friction disk clutch designated generally by the reference character 70.

The clutch 70 comprises a dish or platelike cylinder member 71 detachably connected with the flywheel 63 and cooperating therewith to form a closure for clutch mechanism at one side thereof. The member 71 has lugs 72 projecting from the side thereof adjacent to the flywheel and which have openings through which bolts 73 extend to detachably connect the member to the side of the flywheel, as shown. The inner faces of the lugs 72 have axially extending teeth or splines 74, the purpose of which is explained hereinafter. The member 71 has an annular shape piston chamber formed by a central inwardly projecting tubular bearing member or hub 75 and cylindrical walls 76 concentric therewith, and an annular piston 78 is adapted to reciprocate in the cylinder. Two conventional packing cup type fluid seals 80, 81, are disposed in annular undercut portions of the piston between the adjacent walls of the piston 78 and cylindrical wall 76, and the walls of the central opening through the piston and the outer surface of the hub 75 as may be seen in Fig. 5.

The piston 78 has a radially extending flange 82 having teeth 83 which mesh with the teeth 74 of the cylinder member so that the piston is rotated with the cylinder member but is free to move axially thereof. The piston is biased toward the head end of the cylinder chamber by a plurality of compression springs 85, which surround the shanks of cap screws 86 extending through aligned openings in the piston flange and cylinder member and having their heads engaged in counterbores in the piston flange. The cap screws have nuts 87 thereon against which the springs 85 react to urge the screws and piston toward the head end of the cylinder.

Figure 5:
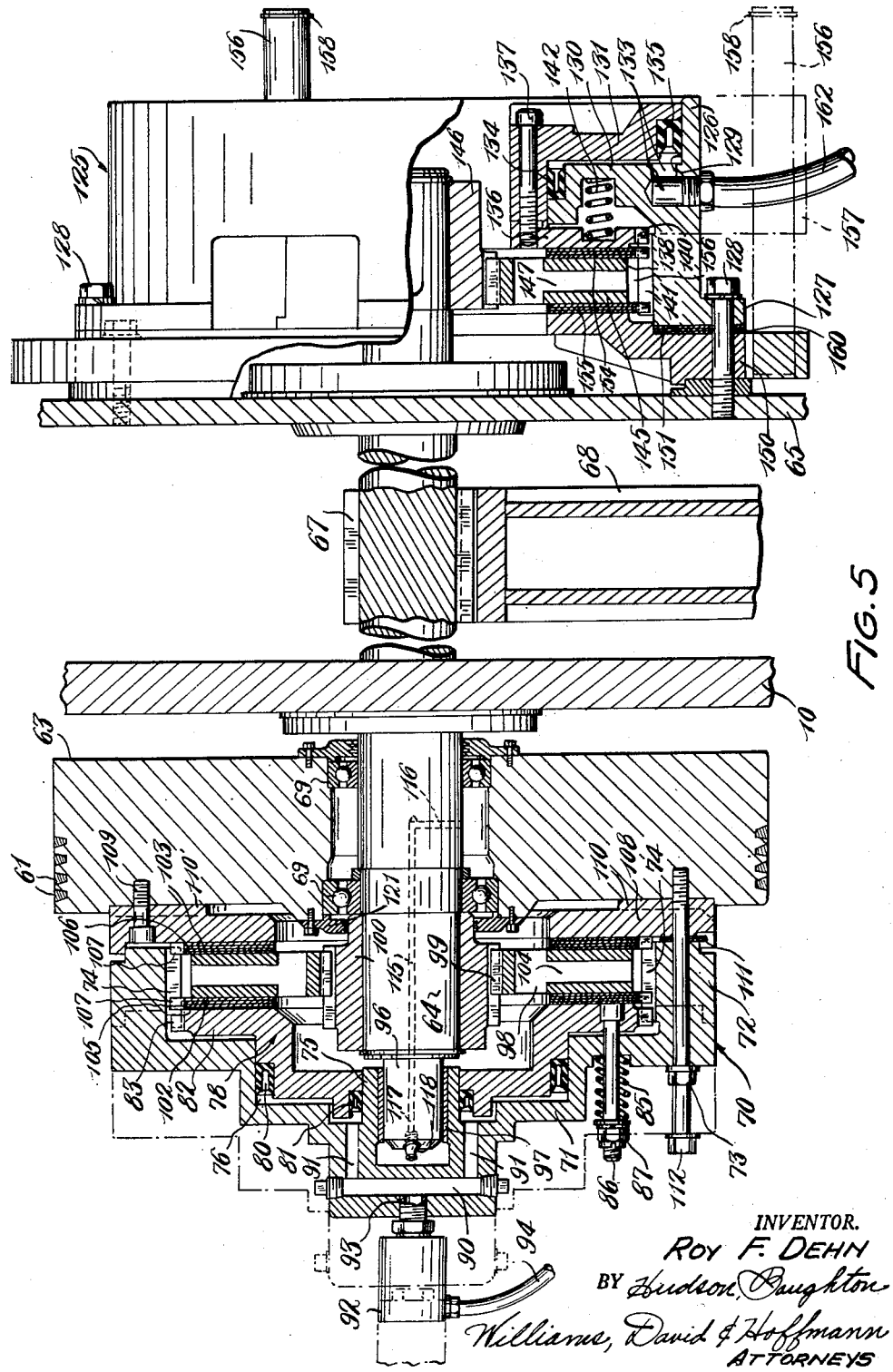
Fig. 5 is a fragmentary sectional view similar to Fig. 4 but on a larger scale.

The cylinder member 71 has a caplike portion which extends over the end of the shaft 64 and through which fluid, such as air, is introduced into the cylinder to actuate the piston. The cap has fluid passages formed by a cross bore 90 and a plurality of bores 91 interconnecting bore 90 with the interior of the cylinder, as seen in Fig. 5. The bore 90 is connected with a suitable rotary seal 92 through an axial bore 93 in which the rotary seal is attached. Air is supplied to the rotary seal through a flexible tube 94 suitably connected with a source of air pressure, not shown.

The end portion of shaft 64 is reduced in diameter as at 96 and a suitable bushing 97 is interposed between the shaft and the hub 75 to support the cylinder member 71 for axial movement on the shaft when the member is unattached to the flywheel, the purpose of which is explained hereinafter.

The piston 78 is adapted to actuate clutch mechanism disposed between the flywheel and piston, and while the clutch mechanism may be of any suitable construction, it is here shown as a single disk friction type comprising a central plate 98 having internal teeth 99 meshing with the teeth of a drive gear 100 keyed to the shaft 64 so that the plate rotates with the shaft and may move axially thereof. The plate 98 provides two oppositely disposed annular friction surfaces 102, 103, and has a series of internal radial air passages 104 leading from adjacent to the hub to the periphery thereof to provide for the circulation of cooling air through the plate.

Figure 6:
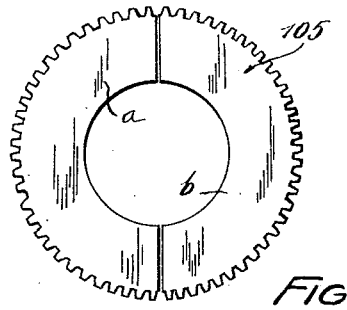
Fig. 6 is an elevational view of a friction clutch member.
Figure 4:
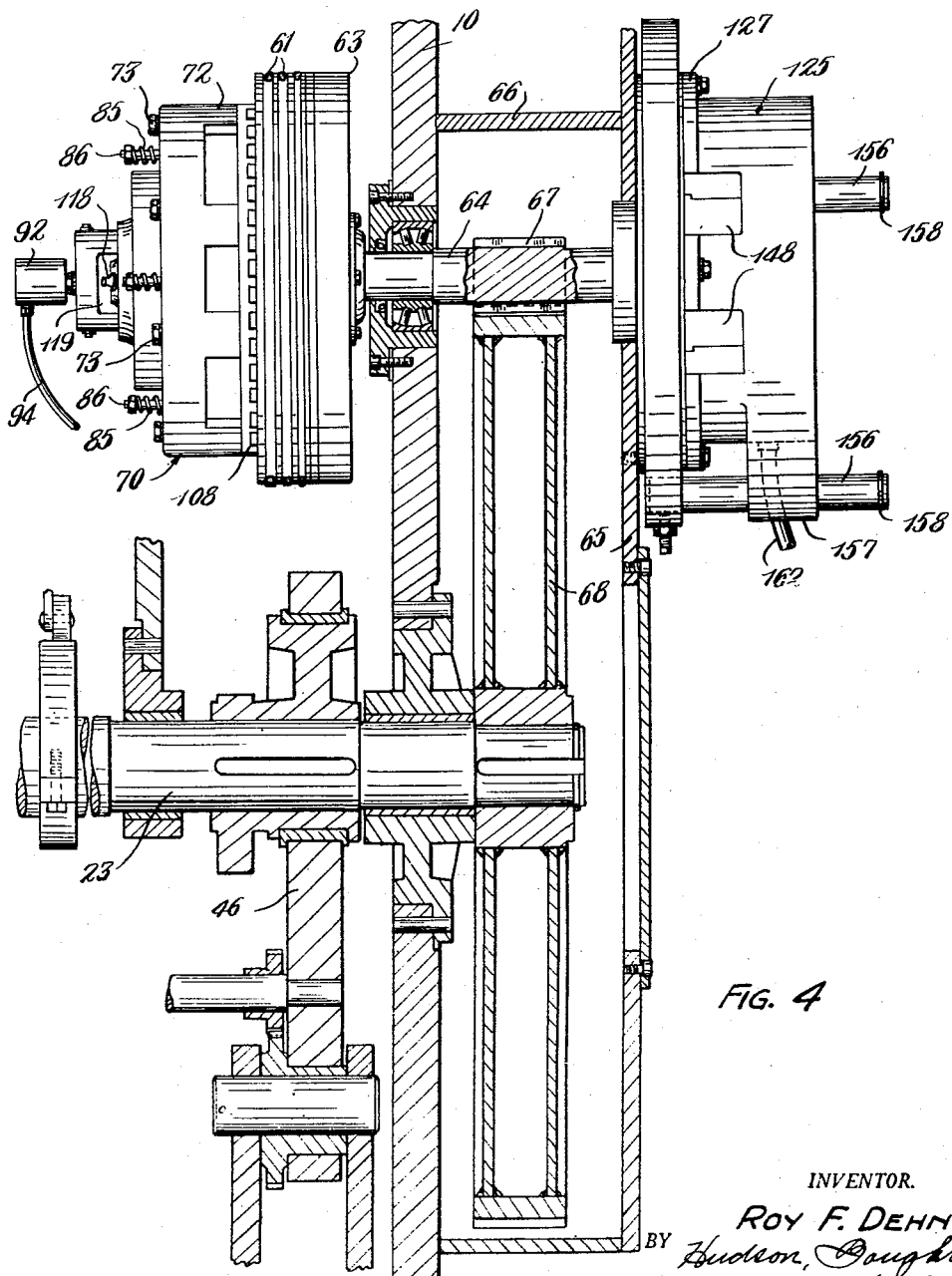
Fig. 4 is a partial sectional view approximately on the line 4—4 of Fig. 3.

Annular friction members 105, 106, of any suitable material are disposed on opposite sides of the plate 98 and they have teeth 107 at the periphery thereof which mesh with the teeth 74 of the cylinder member 71 so that the friction members rotate with the cylinder member and may move axially with respect thereto. Preferably, the friction members 105, 106 each comprise two semi-circular elements a, b as illustrated in Fig. 6, wherein member 105 is shown, which enable the members to be removed and replaced radially relative to the shaft 64, as will be explained more fully hereinafter. The friction member 106 is between surface 103 and a face of an axial clutch plate 108 interposed between the lugs 72 of the cylinder member 71 and the flywheel 63, as shown in Fig. 5. The plate 108 is attached to the flywheel by bolts 109 and the bolts 73 project therethrough and assist in securing the plate to the flywheel. Preferably, the plate 108 has a plurality of radially extending vanes 110 which enable circulation of cooling air between the plate and flywheel.

It will be seen that when air is introduced into the cylinder under sufficient pressure the piston 78 is urged to the right, as viewed in Fig. 5, causing the friction disks 105, 106 to be pressed between the adjacent surfaces of the clutch flange 82 and plates 98, 103 and thereby frictionally connect the flywheel 63 with the shaft 64. When air is exhausted from the cylinder, the springs 85 move the piston toward the cylinder head and release the friction members from their engaging surfaces.

Preferably, shims 111, are initially interposed between the plate 108 and the lugs 72 of the cylinder member when the friction members 105, 106 are new, and these shims may be removed as the friction members wear to take up the resultant slack.

The friction members 105, 106 can be replaced when worn, by unbolting the cylinder member 71 from the flywheel and sliding it to the left as viewed in Fig. 5 so that the friction members can be slid outwardly of the lug 72 and released from the teeth 74 and then removed radially from between the flywheel and cylinder member. New semi-circular friction elements may then be inserted and replaced in similar fashion, and the cylinder member reattached to the flywheel.

The present clutch construction enables the cylinder member 71 to be readily detached from and reattached to the flywheel since the hub 75 thereof is of sufficient length that it supports the cylinder member on the end portion 96 of the shaft 64 with the openings for the securing bolt 73 in alignment with the threaded openings in the side of the flywheel while the cylinder member is moved to a position in which the friction members 105, 106 may be removed and replaced as described previously. Thus, it is unnecessary for the operator to support or lift the cylinder member during the replacement of the friction clutch members and it is only necessary to remove and replace the bolt 73 to gain access to the friction members.

Preferably, the movement of the cylinder member 71 outwardly on the shaft 64 to replace the friction members is limited by two bolts 112, only one of which appears in the drawing, which are similar to the bolts 73 but sufficiently long that they may be threaded into diametric openings in the flywheel. The spacing of the heads of the bolts 73 from the member 71 allows the member 71 to be moved axially a sufficient distance to permit access to the clutch elements but prevents with the heads thereof spaced from the flywheel accidental removal of the cylinder member from the shaft, as is illustrated by the broken lines in Fig. 5. It is to be understood that the bolts 112 are disposed in a position to enable the semi-circular elements of the friction clutch members 105, 106, to be removed without interference therewith.

The bearing 69 for the flywheel is supplied with lubricant through a passage in the shaft 64 comprising an axial bore 115 having a radial bore 116 connecting the inner end with the bearing. The outer end of bore 115 is plugged and an angular bore 117 connects the bore 115 and has a suitable lubrication gun attachment fitting 118 at the outer end thereof, as shown in Fig. 5. The cap or outer end portion of the cylinder member 71 has an opening 119 through which the fitting 118 may be reached by the nozzle of a suitable lubricating gun.

Preferably, an oil baffle ring 121 is attached to the flywheel between the bearing 69 and the clutch to prevent lubricant from entering the clutch mechanism.

As mentioned previously, the rotation of shaft 64 is controlled by a brake which may be of any suitable form, and in the present instance it comprises a fluid operated type friction brake 125 having a construction somewhat similar to that of clutch 70 and is controlled in synchronism therewith so that that brake is applied when the clutch is released and vice versa. The brake 125 is located on the exterior of the wall 65 adjacent to the end of the shaft 64 and comprises a drum shape cylinder member 126 having an outturned flange 127 at one end thereof having openings through which bolts 128 extend to secure the member to the wall 65. The opposite or outer end of the member 126 has cylindrical walls 129 and an inwardly projecting web 130 which forms the head of a piston chamber comprising the cylindrical walls and web and in which an annular piston 131 reciprocates. The cylinder member 126 is bored as at 133 to form a fluid passage into the piston chamber so that when air or other fluid under pressure is introduced into the passage the piston 131 is forced outwardly. Suitable annular packing cups 134, 135 are located in undercut portions of the piston and cylinder member respectively to provide sealing means to prevent escape of fluid from between the piston and cylinder walls.

The piston 131 has a radially extending annular plate 136 attached thereto by bolts 137 and the plate has an annular friction surface 138. The periphery of the plate 136 has teeth 140 which engage with spline-like teeth 141 formed about the interior of the cylinder member 126 so that the piston cannot rotate relative to the cylinder but is free to move axially thereof.

The piston 131 is normally urged toward the cylinder head 130 by a plurality of compression springs 142, seated in aligned cylindrical openings in the web 130 and plate 136. The springs 142 provide sufficient force to apply the brake, in the manner described hereinafter.

The brake mechanism actuated by the piston 131 comprises a friction plate 145 which is splined to a gear 146 keyed to the outer end of the shaft 64 and provides oppositely disposed annular friction surfaces. The friction plate 145 is similar to the friction plate 98 of the clutch and it preferably has radially extending air passages 147 therein through which air may circulate to dissipate heat.

In connection with the cooling of the friction plate 145, the cylinder member 126 has a series of openings 148 adjacent to the flange 127 which provides free circulation of the air through the friction brake mechanism.

A fixed friction plate 150 is interposed between the cylinder member 126 and the wall 65 and provides an annular friction surface 151 which is opposite one of the annular friction faces of the plate 145.

Two sets of arcuate friction members 154, 155 are disposed between the plates 136, 145 and 150 respectively. The friction members 154, 155 are similar to the members 105, 106 described with reference to the clutch and have peripheral teeth 156 which are engaged with the teeth or splines 141 on the cylinder member so that the friction members are free to move axially but are prevented from rotating relative to the cylinder member. The friction members 154, 155 can easily be replaced when worn in a manner similar to that described with reference to the clutch friction members 105, 106 by removing the bolts 128 and the cylinder member 126 outwardly from the plate 150. Handling of the cylinder member is preferably facilitated by the provision of two spaced pins 156 secured to the plate 150 and projecting through openings in lugs 157 formed on the cylinder member. The pins support the cylinder member while it is unbolted from the brake mechanism for access to the friction members and serve to align the cylinder member with the bolt holes for easy replacement of the securing bolts. The pins 156 have grooves about the outer ends thereof in which snap rings 158 are disposed to limit movement of the cylinder member therealong.

It will be seen that the springs 142 normally tend to urge the piston 131 inwardly and force the plate 136, friction member 154, plate 145, and friction member 155 against the fixed plate 150 to frictionally lock the rotating disks 154, 155 with the non-rotating plates 136, 145, 150.

When air is introduced into the passages 133 the piston 131 is moved outwardly to release the friction members from the friction plates.

Preferably, shims 160 are interposed between the cylinder member 126 and the plate 150 when new friction members 154, 155 are installed, and as the friction members wear, the shims may be removed as required to maintain the desired braking action.

Since the brake must release the shaft 64 at the time the clutch engages the shaft with the flywheel, air is introduced to the cylinder members 71 and 126 of the clutch and brake through a common pipe 162 which is connected with an air pressure supply pipe 163 through a solenoid operated three-way valve 164. The valve 164 may be of any well known design, including a solenoid 165 arranged to actuate the valve so that it is energized pipe 162 is connected with the air supply through pipe 163 to direct air pressure to the cylinder members of the clutch and brake, and when the solenoid is deenergized pipe 162 is exhausted to atmosphere.

The circuit for the solenoid 165, shown in Fig. 7, includes suitable power supply lines L1, L2, and preferably, the operation thereof is controlled by the normally open switch 51 which is closed when the pedal 50 is depressed. The switch 51 is connected in series with a relay solenoid 170 which when energized closes a holding contactor 171 and a control contactor 172 in series with the solenoid 165. Thus, when pedal 50 is depressed a circuit is established from L1 through wire 174, switch 51, wire 175, solenoid 170, wire 176 to L2. Solenoid 170 closes contactor 171 to establish a holding circuit from wire 174 to wire 177, a limit switch 178, wire 179, contactor 171, wire 180 to solenoid 170, wire 176 to L2. At the same time contactor 172 is closed to complete a circuit from L1 to solenoid 165 to L2.

The limit switch 178 may be of any suitable type which is normally closed and which has an actuating arm 182 having a roller on the end thereof which rides on a cam 183 attached to the crankshaft 23. The cam is shaped so that when the press has completed a shearing stroke by the crankshaft 23 making one revolution, the switch 178 is momentarily opened to break the circuit through solenoid 170 and thereby open contactor 172 and deenergize the solenoid 165 which results in the application of the brake to stop the rotation of the crankshaft. Thus, the operator need only momentarily close switch 51 to operate the press through a single shearing operation, and if it is desired to provide repeated operations, the pedal 50 is maintained depressed.

It will be apparent that the objects of the invention have been attained as well as others and that a new and improved shear press or the like has been provided which enables ready replacement of the friction elements of the clutch and which provides means to lubricate the flywheel bearing from an exterior part of the clutch mechanism.

Having thus described my invention, I claim:

1. In a shear press or the like, a drive shaft, a flywheel journaled on said shaft adjacent to one end thereof, clutch means disposed at the side of said flywheel adjacent to said end of said shaft for operatively connecting said shaft and said flywheel, means to actuate said clutch means comprising a member cooperating with said flywheel to form a closure for said clutch means and said end of said shaft and movable on said shaft to a position clear of said clutch means, means to detachably connect said member to said flywheel, means slidably supporting said member on said shaft for movement to said position, and means carried by said flywheel connected to said cylinder member outwardly of and clear of said clutch means for guiding the movement of said member between said flywheel and said position and for preventing rotation of said member on said shaft when detached from said flywheel.

2. In a shear press or the like, a drive shaft, a flywheel journaled on said shaft adjacent to one end thereof, clutch means disposed at one side of said flywheel and adjacent to said end of said shaft for operatively connecting said shaft and said flywheel, means to actuate said clutch comprising a member detachably connected to said flywheel and cooperating therewith to form a closure for said clutch means and said end of said flywheel and movable to a position on said shaft clear of said clutch means, means to detachably connect said member to said flywheel, and bearing means slidable with respect to said shaft for supporting said member on the end portion of said shaft for axial movement relative to said flywheel, said bearing means and said end portion being of sufficient lengths that engagement therebetween is maintained when said member is in said position.

3. In a shear press or the like, a drive shaft, a flywheel journaled on said shaft adjacent to one end thereof, clutch means disposed at one side of said flywheel and adjacent to said end of said shaft for operatively connecting said shaft and said flywheel, means to actuate said clutch means comprising a member detachably connected to said flywheel and cooperating therewith to form a closure for said clutch means and a cover for said end of said flywheel and movable to a position on said shaft clear of said clutch means, means to detachably connect said member to said flywheel, cylindrical bearing means supporting said member on the end portion of said shaft for axial movement to said position from said flywheel, said bearing means and said end portion being of sufficient length that engagement therewith is maintained by said member when in said position, and means to limit the movement of said member axially on said bearings means.

4. In a shear press or the like, a drive shaft, a flywheel journaled on said shaft adjacent to one end thereof, clutch means including clutch elements disposed at the side of said flywheel adjacent to said end of said shaft, means to actuate said clutch means comprising a member cooperating with said flywheel to form a closure for said clutch means and said end of said shaft, means to detachably connect said member to said flywheel, spline means on said member cooperating with said clutch means to rotate said clutch means with said member and to permit limited axial movement of said clutch elements with respect to said member, said spline means being disengageable from said clutch elements by a predetermined relative axial movement between said member and clutch means, and means to slidingly support said member for limited axial movement relative to said clutch means, the last mentioned limited axial movement being greater than said predetermined movement.

5. In a shear press or the like, a drive shaft, a flywheel journaled on said shaft adjacent to one end thereof, clutch means including a driving element and a driven element coaxial with said shaft at the side of said flywheel adjacent to said end of said shaft, for operatively connecting said shaft and said flywheel, means to actuate said clutch means comprising a cylinder member having a piston chamber coaxial with said shaft and a hub portion extending inwardly into said chamber and including a bushing slidable axially on said shaft, an annular piston reciprocable in said chamber on said hub portion, seal means between said hub and the walls of the opening through said piston, said cylinder member having a portion forming a closure for said clutch means and adapted to be attached to one side of said flywheel, means to detachably connect said cylinder member to said flywheel, said cylinder member and one of said elements having cooperating means interconnecting the member and the element, said cooperating means being disengageable to disconnect the member from the element upon movement of said cylinder member to a position clear of said elements, and said bushing and said shafts being of such a length that engagement is maintained therebetween upon movement of said cylinder member from said flywheel to said position.

6. In a press or the like, a drive shaft, a flywheel supported on said shaft for rotation with respect thereto, clutch means including a driving clutch element and a driven clutch element coaxial with said shaft and disposed at one side of said flywheel for interconnecting said flywheel and said shaft, said elements being relatively movable between engaged and disengaged positions, a cover member formed to provide a piston chamber coaxial with said shaft and forming with said flywheel a closure for said elements, means detachably connecting said cover member to said flywheel, a piston coaxial with said shaft and movable in said chamber and with respect to said shaft for actuating said elements to one of their positions, said cover member having an axial bore for receiving said shaft and being slidable with respect to said shaft to a position clear of said elements, spline means on said member for interconnecting said member and one of said elements and disengageable from the element upon movement of said cover member to said position, said shaft extending axially in a direction away from said flywheel a distance sufficient that said cover member is supported thereon throughout its movement to said position.

7. In a press, a drive shaft portion, a flywheel journaled on said shaft portion adjacent to said one end thereof, clutch means including a driven clutch element and a driving clutch element relatively movable between engaged and disengaged positions and disposed coaxially with said shaft portion adjacent the side of said flywheel adjacent to said end of said shaft portion, a cover member coaxial with said shaft portion and formed to provide a piston chamber and cooperating with said flywheel to form a closure for said elements, a piston member coaxial with said shaft and operable in said chamber for actuating said elements to one of their positions, means detachably connecting said cover member to said flywheel, spline means on said member interconnecting said member and one of said elements for rotation therewith and permitting relative axial movement between said elements and said member, said spline means and the element connected thereto being disengageable from each other to disengage said member and the element by a predetermined relative axial movement therebetween, and a support member fixed against axial movement slidably supporting and guiding said cover member for axial movement relative to said shaft portion in a direction away from said flywheel and said clutch means, said support member extending in the direction of the axis of said shaft portion a sufficient distance that said cover member is in engagement therewith when moved axially thereon a sufficient distance to disengage said spline means from the element to which it is connected.

8. In a press or the like, a drive shaft, a flywheel journaled on said shaft adjacent to one end thereof, clutch means including clutch elements disposed at the side of said flywheel adjacent to said end of said shaft, means to actuate said clutch means comprising a member cooperating with said flywheel to form a closure for said clutch means and said end of said shaft, means to detachably connect said member to said flywheel, spline means on said member cooperating with said clutch means to rotate an element of said clutch means with said member and to permit limited axial movement of said clutch elements with respect to said member, said spline means being disengageable from the clutch elements by a predetermined relative axial movement between said member and said clutch means, means slidably supporting said member for limited axial movement relative to said clutch means, the last-mentioned limited axial movement being at least as great as the movement necessary to disengage said spline means and the clutch elements, and a plurality of guide members carried by said flywheel extending axially outwardly of the first-said member and connected to the first-said member radially outwardly of said clutch elements for guiding the axial movement of the first-said member and prevent rotation thereof independently of the location of said flywheel.

References Cited in the file of this patent

UNITED STATES PATENTS

| 1,821,127 | Vandeveer | Sept. 1, 1931 |
| 1,968,130 | Criley | July 31, 1934 |
| 2,039,128 | Tiedeman | April 28, 1936 |
| 2,241,241 | Clouse | May 6, 1941 |
| 2,290,542 | Criley | July 21, 1942 |
| 2,360,489 | Gillett | Oct. 17, 1944 |
| 2,402,052 | Johansen | June 11, 1946 |
| 2,580,381 | Banker | Jan. 1, 1952 |
| 2,586,617 | Danby | Feb. 19, 1952 |
| 2,588,012 | Kirkpatrick | March 4, 1952 |
| 2,606,637 | Davoust | Aug. 12, 1952 |

OTHER REFERENCES

Publication—Danly Catalogue, Danly Machine Specialties, Inc., 2100 South Laramie Avenue, Chicago 50, Illinois. Printed in U. S. A., June 1950.